(12) United States Patent
Itou et al.

(10) Patent No.: US 9,401,624 B2
(45) Date of Patent: Jul. 26, 2016

(54) CHARGING DEVICE, ELECTRONIC EQUIPMENT, AND CHARGING SITUATION NOTIFYING METHOD

(71) Applicant: FUJIFILM Corporation, Tokyo (JP)

(72) Inventors: Ryousuke Itou, Saitama (JP); Koudai Fujita, Saitama (JP); Junji Hayashi, Saitama (JP); Masanari Asano, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/633,706

(22) Filed: Feb. 27, 2015

(65) Prior Publication Data

US 2015/0171660 A1 Jun. 18, 2015

Related U.S. Application Data

(63) Continuation of application No. PCT/JP2013/062717, filed on May 1, 2013.

(30) Foreign Application Priority Data

Aug. 30, 2012 (JP) ................................ 2012-189505

(51) Int. Cl.
*H02J 7/00* (2006.01)
*H02J 7/02* (2016.01)
*H02J 7/04* (2006.01)

(52) U.S. Cl.
CPC .. *H02J 7/025* (2013.01); *H02J 7/04* (2013.01)

(58) Field of Classification Search
USPC ........................................................ 320/108
See application file for complete search history.

(56) References Cited

U.S. PATENT DOCUMENTS

2012/0007549 A1* 1/2012 Murayama ............. H02J 7/025
320/108

FOREIGN PATENT DOCUMENTS

| JP | 2000-287369 A | 10/2000 |
|---|---|---|
| JP | 2003-79075 A | 3/2003 |
| JP | 2004-289953 A | 10/2004 |
| JP | 2011-120361 A | 6/2011 |
| JP | 2011-244624 A | 12/2011 |
| JP | 2012-19666 A | 1/2012 |

OTHER PUBLICATIONS

International Search Report, issued in PCT/JP2013/062717, dated Aug. 6, 2013.
Written Opinion of the International Searching Authority, issued in PCT/JP2013/062717, dated Aug. 6, 2013.

* cited by examiner

*Primary Examiner* — Robert Grant
(74) *Attorney, Agent, or Firm* — Birch, Stewart, Kolasch & Birch, LLP

(57) ABSTRACT

A charging system 100 includes an electronic equipment 1 and a charging device 2. The charging device 2 includes a control unit 22 that controls a magnetic field generated from a variable magnetic field generating unit 25 which generates a variable magnetic field, and the control unit 22 controls a strength of the magnetic field generated from the variable magnetic field generating unit 25, in accordance with a remaining capacity or an available charging free capacity in a battery 11 of the electronic equipment 1 receiving a power transmitted from a feed circuit 21.

25 Claims, 13 Drawing Sheets

CHARGING DEVICE, ELECTRONIC EQUIPMENT, AND CHARGING SITUATION NOTIFYING METHOD

CROSS REFERENCE TO RELATED APPLICATION

This is a continuation of International Application No. PCT/JP2013/062717 filed on May 1, 2013, and claims priority from Japanese Patent Application No. 2012-189505, filed on Aug. 30, 2012, the entire disclosures of which are incorporated herein by reference.

TECHNICAL FIELD

The present invention relates to a charging device, an electronic equipment, and a charging situation notifying method using the same.

BACKGROUND ART

Many electronic equipments in which a battery is installed, such as a portable phone represented by a smart phone, a digital camera, a tablet terminal, and a notebook computer uses a secondary cell as a power source. The secondary cell is mostly charged by a connector pin using a dedicated cradle, but it is also suggested to charge the secondary cell by a wireless charging device using electromagnetic induction.

Recently, the installation of a wireless charging function specifically in a smart phone has become popular and a wireless charging device and an electronic equipment corresponding thereto are being marketed to meet the above demand.

Patent Literature 1 discloses a system which transmits information such as a charging progress situation of a battery from an electronic equipment such as a digital camera to a wireless charging device and displays the progress situation on a display unit of the wireless charging device.

Patent Literature 2 discloses a system of charging a battery of an electrical vehicle which starts charging in a state where a power receiving plug and a power feeding plug are coupled to each other by an electromagnet at the time when the charging starts and disconnects the coupled state of the power receiving plug and the power feeding plug when a predetermined time has elapsed after the charging starts and the charging ends.

Patent Literature 3 discloses a digital camera corresponding to wireless charging. In order to prevent breakage or erroneous operation of an electronic circuit component such as an IC, the digital camera is configured such that a component which is less affected by a magnetic field generated at the time of charging is disposed at a right half side as seen from a rear surface and an IC which is easily affected by the magnetic field is disposed at a left half side.

CITATION LIST

Patent Literature

Patent Literature 1: JP-A-2012-19666
Patent Literature 2: JP-A-2004-289953
Patent Literature 3: JP-A-2003-79075

SUMMARY OF INVENTION

Technical Problem

As disclosed in Patent Literature 1, even though it is convenient when the charging progress situation is displayed on the display unit, it is required to provide the display unit at the charging device side according to Patent Literature 1 so that cost of the charging device and the electronic equipment may be increased.

Further, even though the charging progress situation can be displayed on the display unit of the electronic equipment side, since the display unit of the electronic equipment has mostly a large size screen, the amount of power consumed for displaying the progress is large, and thus a charging efficiency is lowered.

The present invention has been made in an effort to provide a charging device and a wireless charging enabled electronic equipment in which a charging situation of the electronic equipment which is being wirelessly charged can be comprehended without incurring unnecessary cost.

Solution to Problem

The present invention discloses a charging device having a power transmitting unit which wirelessly transmits power, including: a magnetic field generating unit that generates a magnetic field having a variable strength; a magnetic field control unit that controls the magnetic field generated by the magnetic field generating unit; and a determining unit that determines whether an electronic equipment capable of receiving the power transmitted by the power transmitting unit has a magnetized material having a magnetizing property, in which when the determining unit determines that the electronic equipment has the magnetized material, the magnetic field control unit controls the strength of the magnetic field generated by the magnetic field generating unit to vary at plural levels excluding zero in accordance with a remaining capacity or an available charging free capacity in a battery of the electronic equipment.

The present invention discloses an electronic equipment having a power receiving unit which receives a power wirelessly transmitted from a charging device including a magnetized material having a magnetizing property and a battery charged by the power received by the power receiving unit, the electronic equipment including: a magnetic field generating unit that generates a magnetic field having a variable strength; and a magnetic field control unit that controls the magnetic field generated by the magnetic field generating unit, in which the magnetic field control unit varies the strength of the magnetic field generated by the magnetic field generating unit at plural levels excluding zero, in accordance with a remaining capacity or an available charging free capacity in the battery.

The present invention discloses a charging situation notifying method which uses a charging device having a power transmitting unit which wirelessly transmits a power and a magnetic field generating unit which generates a magnetic field, the method including: a magnetic field control step of varying, by the charging device, a strength of the magnetic field generated by the magnetic field generating unit; and a determining step of determining whether an electronic equipment capable of receiving the power transmitted by the power transmitting unit has a magnetized material having a magnetizing property, in which in the magnetic field control step, the strength of the magnetic field generated by the magnetic field generating unit varies at plural levels excluding zero, in accordance with a remaining capacity or an available charging free capacity in a battery of the electronic equipment determined to have the magnetized material.

The present invention discloses a charging situation notifying method which uses an electronic equipment having a power receiving unit which receives a power wirelessly transmitted from a charging device including a magnetized material having a magnetizing property, a battery charged by the power received by the power receiving unit, and a magnetic field generating unit which generates a magnetic field, the method including: a magnetic field control step of varying, by the electronic equipment, a strength of the magnetic field generated by the magnetic field generating unit, in which in the magnetic field control step, the electronic equipment varies the strength of the magnetic field at plural levels excluding zero, in accordance with a remaining capacity of the power or an available charging free capacity in the battery.

Advantageous Effects of Invention

According to the present invention, a charging device and a wireless charging enabled electronic equipment in which a charging situation of the electronic equipment which is being wirelessly charged can be comprehended without incurring cost may be provided.

BRIEF DESCRIPTION OF DRAWINGS

FIG. 8 is a flow chart explaining an operation of a charging system including an electronic equipment 1 and a charging device 2a.

DESCRIPTION OF EMBODIMENTS

Hereinafter, an embodiment of the present invention will be described with reference to the drawings.

Figure 1:
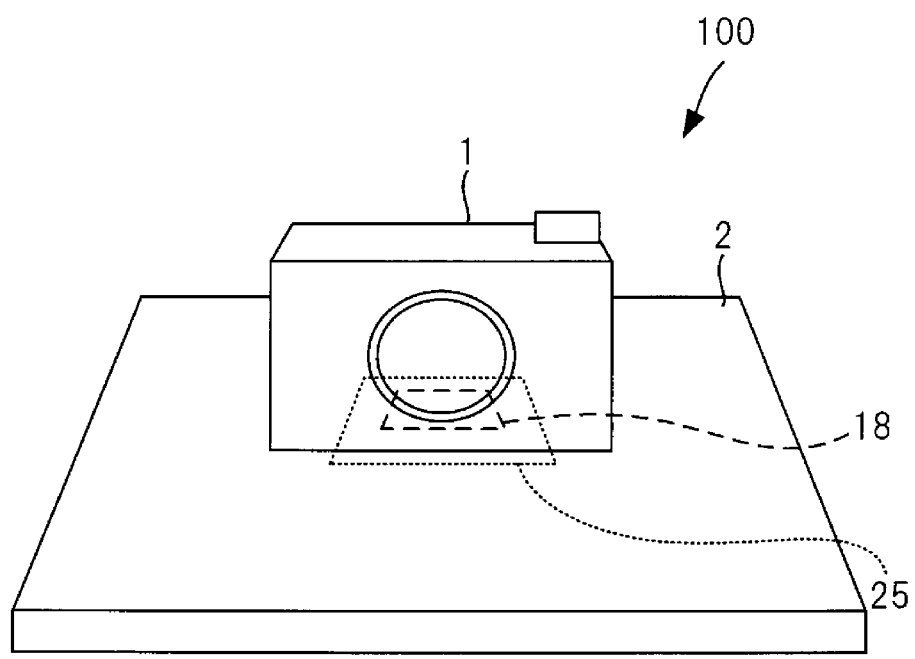
FIG. 1 is a view illustrating a schematic configuration of a charging system explaining an embodiment of the present invention.

FIG. 1 is a view illustrating a schematic configuration of a charging system explaining an embodiment of the present invention.

A charging system 100 includes an electronic equipment 1 (which is a digital camera in an example of FIG. 1) in which a battery (a secondary cell) is mounted and a charging device 2 which charges the battery of the electronic equipment 1.

In the electronic equipment 1, a magnetic body 18 which is a magnetized material having a magnetizing property is installed on a bottom surface of a case. The magnetized material includes a magnet (a permanent magnet and an electromagnet) having a property (spontaneous magnetizing property) which spontaneously magnetizes regardless of a magnetic field from other material and a magnetic body (a ferromagnetic body, a paramagnetic body, and a diamagnetic body) having a property (involuntary magnetizing property) which involuntarily magnetizes and the magnetic body is used herein.

Further, "a material having an involuntary magnetizing property" refers to a material having a property that magnetization disappears from all the parts of a material when a magnetic field is removed.

In the charging device 2, a flat unit is provided in the case in order to dispose the electronic equipment 1 and a variable magnetic field generating unit 25 which generates a magnetic field having a variable strength is mounted in the flat unit. In the charging system 100, magnetic force is generated between the variable magnetic field generating unit 25 and the magnetic body 18 by the magnetic field generated from the variable magnetic field generating unit 25.

Figure 2:
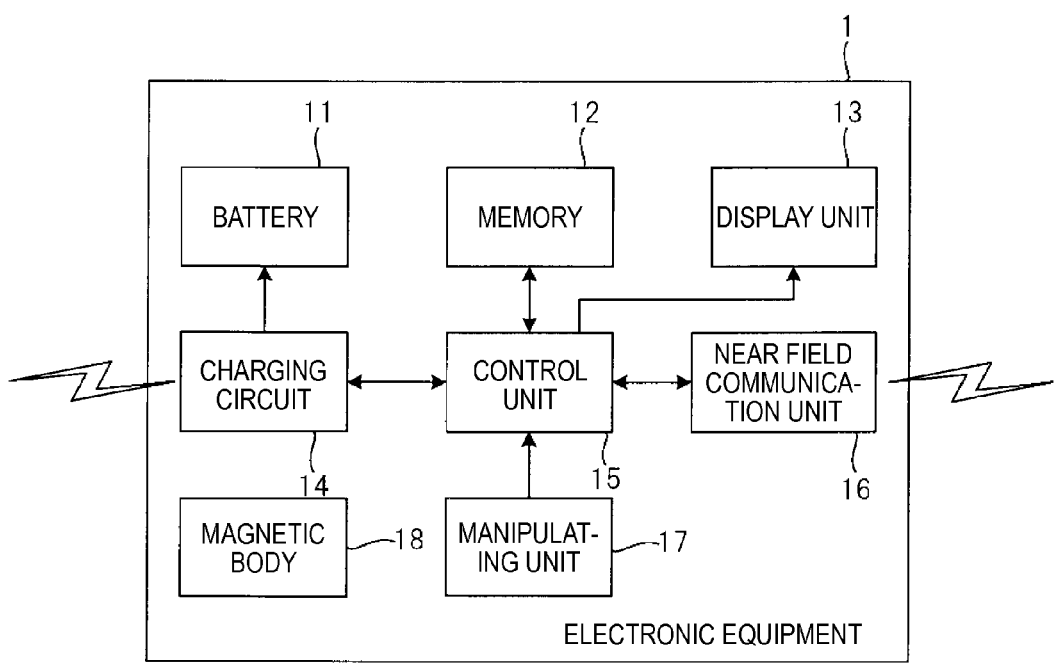
FIG. 2 is a view illustrating an internal configuration of an electronic equipment 1 used for a charging system 100 illustrated in FIG. 1.

FIG. 2 is a view illustrating an internal configuration of the electronic equipment 1 used for the charging system 100 illustrated in FIG. 1.

The electronic equipment 1 includes a battery 11, a charging circuit 14 which charges the battery 11, a control unit 15 which collectively controls the overall electronic equipment, a manipulating unit 17 which issues various instructions to the control unit 15, a memory 12, a display unit 13 configured by liquid crystal or an organic EL to display various information, a near field communication unit 16, and a magnetic body 18 such as a ferromagnetic body or a diamagnetic body. The electronic equipment 1 may not have the display unit 13.

The charging circuit 14 includes a power receiving coil and receives power which is wirelessly supplied from a feed circuit 21 of the charging device 2 which will be described below to charge the battery 11 with the power.

The charging circuit 14 includes a remaining battery capacity detecting circuit which detects a remaining capacity in the battery 11 (a remaining battery capacity) and information on the remaining battery capacity detected by the remaining battery capacity detecting circuit is transmitted to the control unit 15.

The near field communication unit 16 wirelessly performs communication with another equipment without passing through a network such as the Internet.

The near field communication unit 16 is configured by a communication module complying with a standard such as contactless IC or Bluetooth (registered trademark).

The memory 12 includes a ROM which stores a program executed by the control unit 15 or a RAM serving as a work memory.

When the battery 11 starts to be charged by the charging circuit 14, the control unit 15 regularly obtains information of a remaining capacity detected by the remaining battery capacity detecting circuit and transmits the obtained information from the near field communication unit 16 to the charging device 2.

Figure 3:
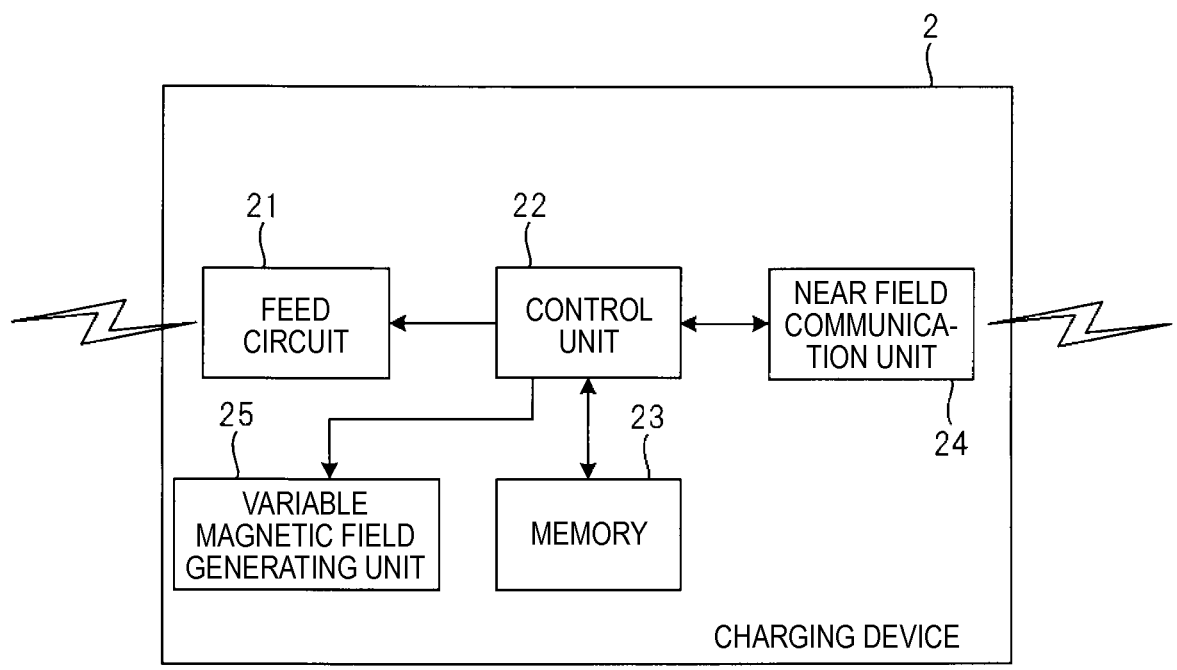
FIG. 3 is a view illustrating an internal configuration of a charging device 2 used for a charging system 100 illustrated in FIG. 1.

FIG. 3 is a view illustrating an internal configuration of the charging device 2 used for the charging system 100 illustrated in FIG. 1.

The charging device 2 includes a feed circuit 21 including a feed coil, a control unit 22 which collectively controls the overall charging device 2, a memory 23 including a RAM or a ROM, a near field communication unit 24, and a variable magnetic field generating unit 25. The charging device 2 includes a flat unit on which the electronic equipment 1 is disposed and the feed circuit 21 is mounted in the flat unit.

The near field communication unit 24 performs communication with another equipment including the electronic equipment 1 without passing through a network. The near field communication unit 24 is configured by a communication module complying with a standard such as contactless IC or Bluetooth (registered trademark).

The variable magnetic field generating unit 25 is, for example, an electromagnet and a magnitude of an electric current flowing into a coil is controlled by the control unit 22 so as to generate a magnetic field having a variable strength.

One part of a north pole and a south pole of the electromagnet which configures the variable magnetic field generating unit 25 is disposed on a surface of the flat unit of the charging device 2 on which the electronic equipment 1 is disposed and the other part of the north pole and the south pole of the electromagnet is disposed at an opposite surface to the surface of the flat unit of the charging device 2 on which the electronic equipment 1 is disposed.

The control unit 22 performs communication with the near field communication unit 16 of the electronic equipment 1 disposed on the flat unit of the charging device 2, by the near field communication unit 24 and obtains information on a remaining battery capacity in the battery 11 from the electronic equipment 1. The control unit 22 controls the strength of the magnetic field generated from the variable magnetic field generating unit 25, in accordance with the information of the remaining battery capacity.

An operation of the charging system 100 configured as described above will be described.

Figure 4:
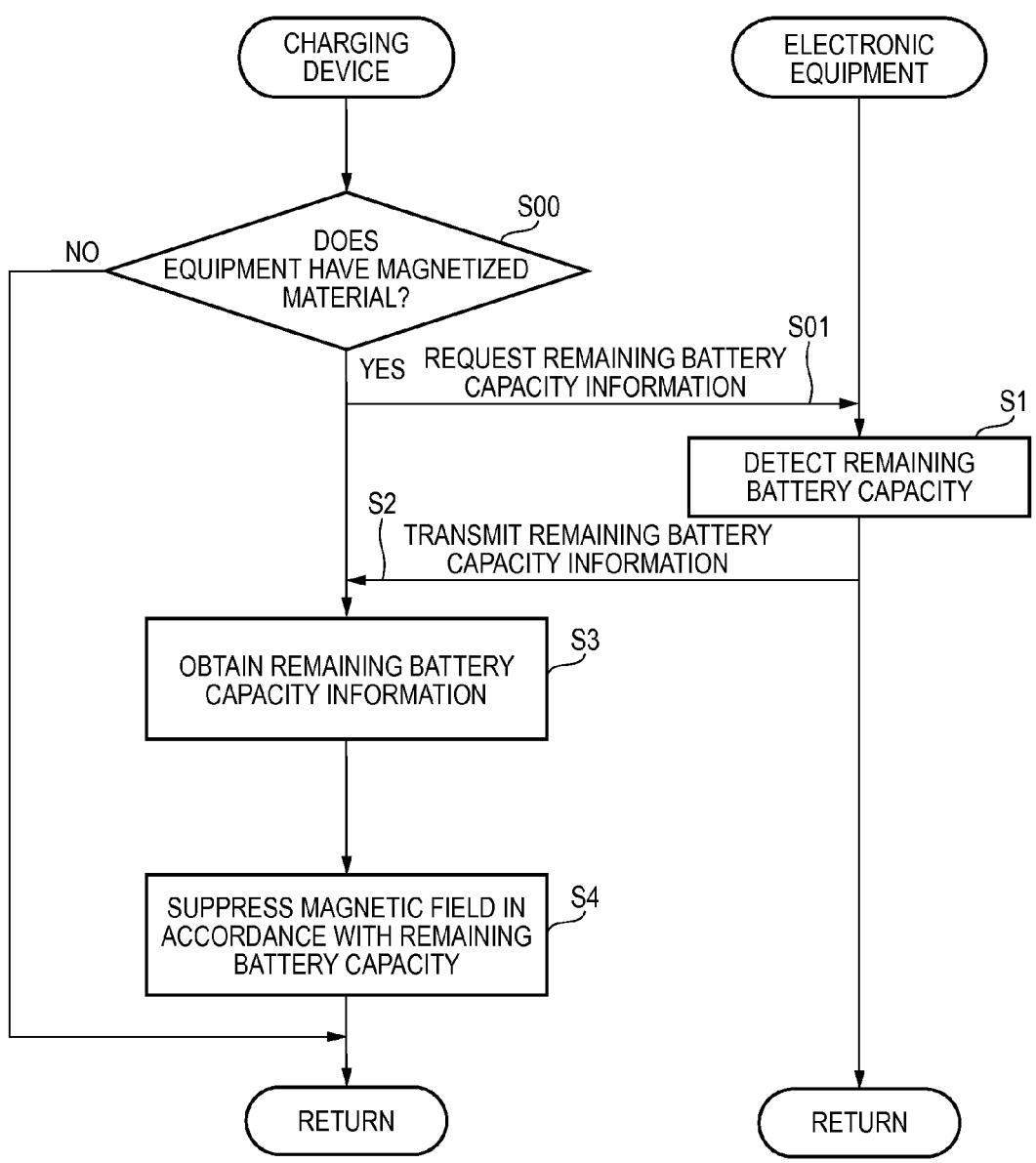
FIG. 4 is a flow chart explaining an operation of a charging system 100.

FIG. 4 is a flow chart explaining an operation of the charging system 100.

When an electronic equipment capable of wirelessly receiving power is disposed on the flat unit of the charging device 2, the control unit 22 of the charging device 2 starts to transmit the power to the electronic equipment (starts to charge the electronic equipment).

After starting charging, the control unit 22 of the charging device 2 determines whether the electronic equipment 1 to be charged has a magnetized material (step S00).

This determination may be performed using a method of obtaining information indicating presence of the magnetized material by wireless communication based on a communication standard of contactless charging from the electronic equipment side to perform determination, a method of letting an owner of the electronic equipment input information on the presence of the magnetized material to the charging device and causing the control unit 22 to obtain the information, and a method of providing a proximity sensor in the charging device and determining the presence of the magnetized material from a value of eddy current flowing in the proximity sensor.

When the determination in step S00 is YES, the control unit 22 transmits a signal which requests to transmit the remaining battery capacity information to the electronic equipment 1 through the near field communication unit 24 (step S01).

When the determination in step S00 is NO, the control unit 22 performs only a general charging process. That is, the control unit 22 does not perform a control to generate a magnetic field from the magnetic field generating unit 25.

The electronic equipment 1 which receives a request signal transmitted in step S01 detects a remaining capacity in the battery 11 by the charging circuit 14 (step S1). The control unit 15 of the electronic equipment 1 obtains the information of the remaining capacity and transmits the information to the charging device 2 through the near field communication unit 16 (step S2).

In the charging device 2, the near field communication unit 24 receives the information of the remaining capacity in the battery 11 and the control unit 22 obtains the information (step S3). The control unit 22 determines the strength of the magnetic field generated from the variable magnetic field generating unit 25 as plural levels of values excluding zero in accordance with the remaining battery capacity based on the obtained information and causes the variable magnetic field generating unit 25 to generate the magnetic field with the determined strength (step S4).

When a ferromagnetic body or a paramagnetic body is used as a magnetic body 18, the magnetic field generated from the variable magnetic field generating unit 25 is controlled to generate variable attractive force with the magnetic body 18 of the electronic equipment 1.

Specifically, the control unit 22 controls the strength of the magnetic field generated from the variable magnetic field generating unit 25 to be higher as the remaining battery capacity is larger. Therefore, the attractive force generated between the variable magnetic field generating unit 25 and the magnetic body 18 of the electronic equipment 1 may be stronger as the remaining battery capacity is larger.

When the determination in step S00 is YES, in the charging system 100, processes from step S1 to step S4 are regularly repeated.

When charging of the electronic equipment 1 starts by the above-described operation, the strength of the attractive force generated between the electronic equipment 1 and the charging device 2 varies depending on the remaining capacity in the battery 11. Therefore, a user who lifts the electronic equipment 1 during the charging may sensuously notice the remaining battery capacity of the electronic equipment 1 in accordance with the strength of the attractive force generated between the electronic equipment 1 and the charging device 2.

Further, the control unit 22 may control the strength of the magnetic field generated from the variable magnetic field generating unit 25 to be lower as the remaining battery capacity is larger.

In this case, when the battery 11 starts to be charged, since the attractive force is strong, the electronic equipment 1 feels heavy when the user lifts the electronic equipment 1 from the charging device 2, and the attractive force is weaker as the charging progresses and the electronic equipment 1 feels light.

Further, the control unit 22 may control the strength of the magnetic field generated from the variable magnetic field generating unit 25 in accordance with an available charging capacity (a free battery capacity) in the battery 11.

For example, a circuit which detects an free capacity in the battery 11 is provided in the charging circuit 14 of the electronic equipment 1 and the control unit 22 of the charging device 2 obtains information on the free capacity is obtained and controls the strength of the magnetic field depending on the obtained information of the free capacity. Accordingly, the same effect as the case when the strength of the magnetic field is controlled in accordance with the remaining battery capacity may be obtained.

Further, the magnetic force generated between the variable magnetic field generating unit 25 and the magnetic body 18 may be not an attractive force, but a repulsive force.

In this case, a diamagnetic body such as bismuth is used as the magnetic body 18 and the control unit 22 controls the magnetic field generated from the variable magnetic field generating unit 25 to generate a variable repulsive force between the magnetic body 18 of the electronic equipment 1 and the variable magnetic field generating unit 25.

Further, the strength of the magnetic field generated from the variable magnetic field generating unit 25 may be set to be plural levels of values with respect to the same remaining battery capacity.

For example, in the electronic equipment 1 or the charging device 2, the strength of the magnetic field generated from the variable magnetic field generating unit 25 may be set to three levels of strong, normal, and weak and the control unit 22 may determine the strength of the magnetic field generated from the variable magnetic field generating unit 25 in accordance with the set level.

Further, the strength of the magnetic field generated from the variable magnetic field generating unit 25 may be set to an arbitrary value, regardless of the remaining battery capacity.

For example, a communication unit connected to the network such as the Internet is provided in the charging device 2 and a signal which indicates a magnitude of a magnetic force generated between the variable magnetic field generating unit 25 and the magnetic body 18 is transmitted from a communication terminal which can be connected to the network such as a smart phone to the charging device 2. When the control unit 22 of the charging device 2 receives the signal, the control unit 22 sets the magnetic field generated from the variable magnetic field generating unit 25 to a predetermined strength.

For example, when a user leaves the electronic equipment 1 on the charging device 2 and maximizes the attractive force generated between the electronic equipment 1 and the charging device 2 by remote manipulation, the electronic equipment 1 is fixed onto the charging device 2, so that the electronic equipment 1 is prevented from being stolen.

Next, a modified embodiment of the charging system 100 illustrated in FIG. 1 will be described.

First Modified Embodiment

Figure 5:
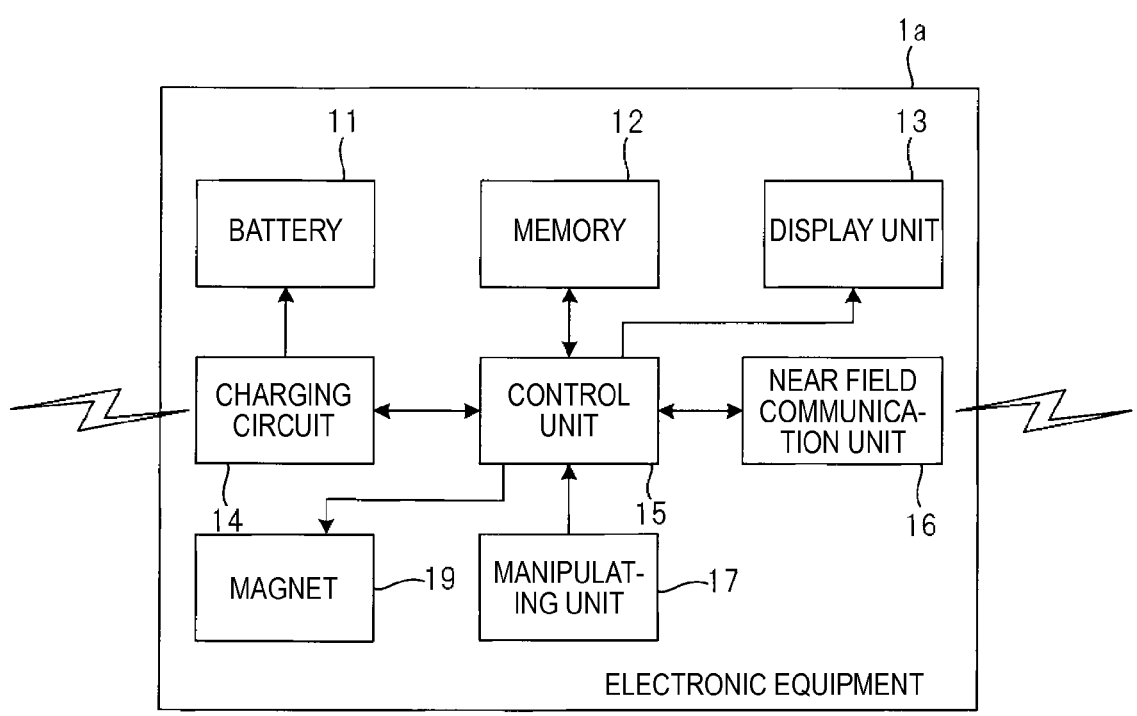
FIG. 5 is a block diagram illustrating an internal configuration of an electronic equipment 1a which is a modified embodiment of an electronic equipment 1 in a charging system 100.

FIG. 5 is a block diagram illustrating an internal configuration of an electronic equipment 1a which is a modified embodiment of the electronic equipment 1 in a charging system 100. The electronic equipment 1a has the same configuration as the electronic equipment 1 except for providing a magnet 19 as a magnetized material instead of the magnetic body 18.

The magnet 19 is configured by a permanent magnet or an electromagnet. Hereinafter, an example in which the electromagnet is used as the magnet 19 will be described.

One part of a north pole and a south pole of the magnet 19 is disposed toward a bottom surface of the electronic equipment 1 and the other part of the north pole and the south pole of the electromagnet 19 is disposed toward a top surface of the electronic equipment 1.

Figure 6:
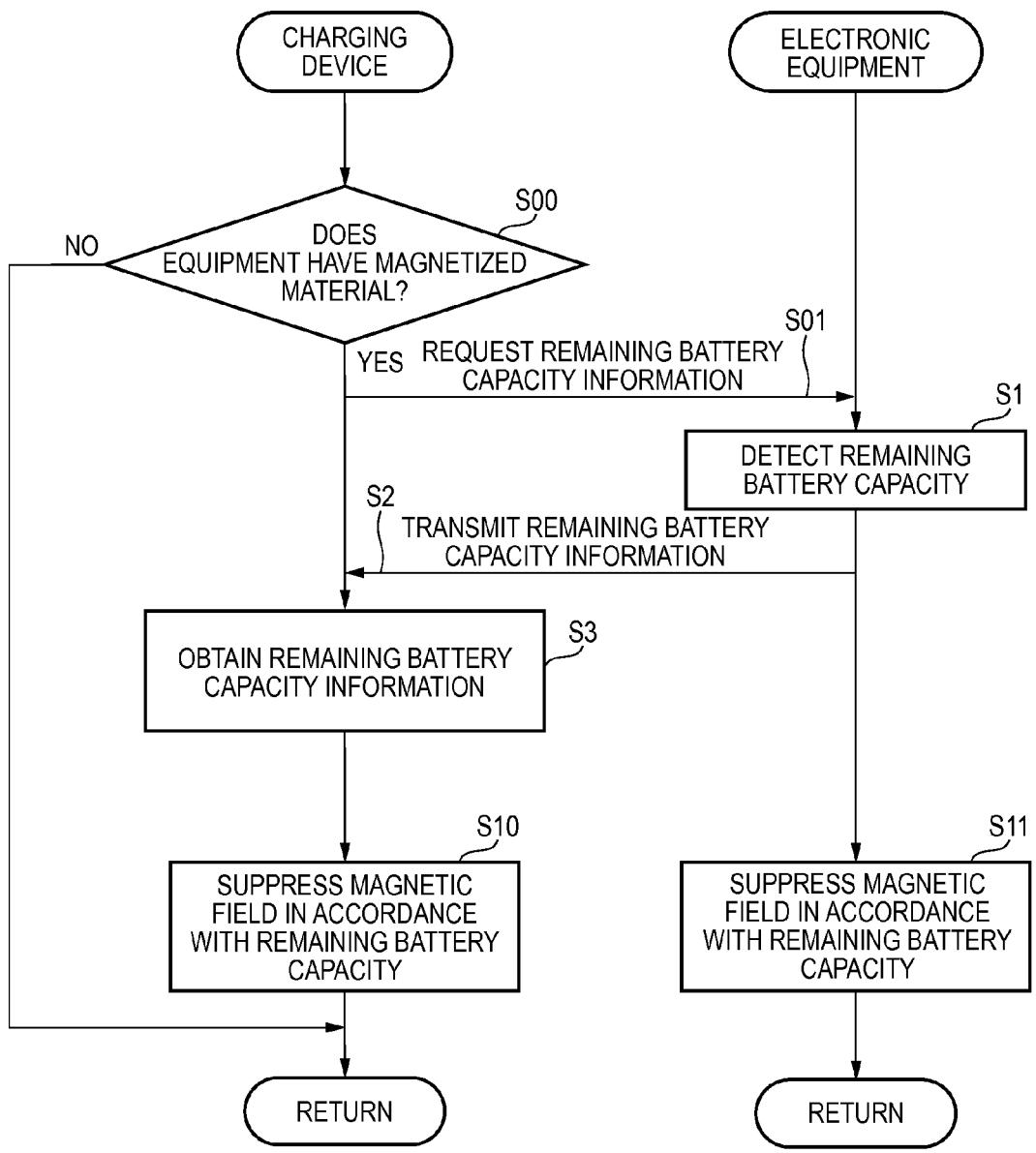
FIG. 6 is a flow chart explaining an operation of a charging system including an electronic equipment 1a and a charging device 2.

FIG. 6 is a flow chart explaining an operation of a charging system including the electronic equipment 1a and a charging device 2. Processes of FIG. 6 which are the same as the processes in FIG. 4 are denoted by the same reference symbols.

When a control unit 15 of the electronic equipment 1a obtains information on a remaining battery capacity from a charging circuit 14, the control unit 15 transmits the information to the charging device 2 in step S2 and controls the strength of a magnetic field generated from the magnet 19 in accordance with the information again in step S11 (step S11).

In the meantime, the control unit 22 of the charging device 2 which obtains the remaining battery capacity information from the electronic equipment 1a controls the strength of the magnetic field generated from the variable magnetic field generating unit 25 in accordance with the obtained information (step S10).

In steps S10 and S11, the magnetic field generated from the magnet 19 and the variable magnetic field generating unit 25 is a magnetic field in which both opposing parts are homopolarity or antipolarity.

That is, according to a first modified embodiment, any of an attractive force and a repulsive force may be selectively generated between the magnet 19 and the variable magnetic field generating unit 25. Further, for example, the attractive force or the repulsive force is controlled to be stronger or weaker as the remaining battery capacity is larger so that the remaining capacity in the battery 11 may be sensuously notified.

When the repulsive force is generated between the magnet 19 and the variable magnetic field generating unit 25, for example, when the remaining battery capacity is small, the repulsive force is decreased by weakening a magnetic field to be generated and the repulsive force is increased by increasing the magnetic field as the remaining battery capacity is increased.

By doing this, as the charging progresses, the electronic equipment 1a is easily lifted, so that convenience at the time of usage of the electronic equipment 1a after completely charging the battery may be improved.

Similarly, when the attractive force is generated between the magnet 19 and the variable magnetic field generating unit 25, for example, when the remaining battery capacity is small, the attractive force is increased by increasing a magnetic field and the attractive force is decreased by weakening the magnetic field as the remaining battery capacity is increased.

By doing this, as the charging progresses, the electronic equipment 1a is easily lifted, so that convenience at the time of usage of the electronic equipment 1a after completely charging the battery may be improved.

Further, the charging device 2 may be configured such that the strength of the magnetic field generated from the variable magnetic field generating unit 25 is controlled in accordance with the remaining battery capacity and the electronic equipment 1a may be configured such that a magnetic field generated from the magnet 19 is a magnetic field having a predetermined fixed strength (that is, the magnet 19 is a permanent magnet).

Similarly in this configuration, the attractive force or the repulsive force may be generated between the magnet 19 and the variable magnetic field generating unit 25 in accordance with the remaining battery capacity.

The control unit 22 of the charging device 2 may control to generate the attractive force in accordance with the remaining battery capacity between the magnet 19 and the variable magnetic field generating unit 25 until the battery 11 is completely charged and generates a strong repulsive force between the magnet 19 and the variable magnetic field generating unit 25 when the battery 11 is completely charged.

By doing this, the electronic equipment 1a is in contact with the charging device 2 during the charging and the electronic equipment 1a may be floated from the charging device 2 after completing the charging. Therefore, it may be notified to the user to easily understand that the charging is completed.

In this modified embodiment, even though any of the repulsive force and the attractive force may be generated between the variable magnetic field generating unit 25 and the magnet 19, a magnetic force generated during the charging may be manually selected to be the repulsive force or the attractive force.

For example, a manipulating unit of the electronic equipment 1a is manipulated to set which of the repulsive force and the attractive force is generated and the setting information may be transmitted from the electronic equipment 1a to the charging device 2.

Further, a communication unit connected to the network such as the Internet is provided in at least one of the electronic equipment 1a and the charging device 2 and a signal which indicates the setting may be transmitted from a communication terminal which can be connected to the network such as a smart phone to at least one of the electronic equipment 1a and the charging device 2.

Further, when a predetermined condition is satisfied, the control unit 22 of the charging device 2 may control to alternately switch the magnetic force generated between the variable magnetic field generating unit 25 and the magnet 19 into the repulsive force and the attractive force.

For example, the magnetic field generated from the magnet 19 is fixed (including a case when the magnet 19 is a permanent magnet) and a direction of the magnetic field generated from the variable magnetic field generating unit 25 is alternately switched to alternately generate the repulsive force and the attractive force.

Further, the repulsive force and the attractive force may be alternately generated by repeatedly performing control to change a direction of a magnetic field generated from the magnet 19 and a direction of a magnetic field generated from the variable magnetic field generating unit 25 into reverse directions at the same timing.

In this case, a signal instructing to switch the direction of the magnetic field is transmitted from the control unit 22 of the charging device 2 to the electronic equipment 1a and the control unit 15 of the electronic equipment 1a may control the magnetic field generated from the magnet 19 in accordance with the signal.

As the above-described predetermined condition, for example, the battery 11 is completely charged or the control unit 22 receives the instruction signal from the outside.

When the battery 11 is completely charged, the control unit 22 alternately generates the repulsive force and the attractive force between the variable magnetic field generating unit 25 and the magnet 19, so that the electronic equipment 1a performs a bouncing operation from the charging device 2 and it is notified that the charging is completed by a state or an operating sound at this time.

Further, a communication unit connected to the network such as the Internet is provided in the charging device 2 to transmit a signal which instructs to alternately generate the attractive force and the repulsive force is transmitted from a communication terminal which can be connected to the network such as a smart phone to the charging device 2.

When the control unit 22 of the charging device 2 receives the signal, the control unit 22 alternately generates the repulsive force and the attractive force between the variable magnetic field generating unit 25 and the magnet 19. By doing this, when the electronic equipment 1a is left on the charging device 2 somewhere, searching of the electronic equipment 1a may be assisted in accordance with a bouncing operation of the electronic equipment 1a from the charging device 2 or an operating sound.

Second Modified Embodiment

Figure 7:
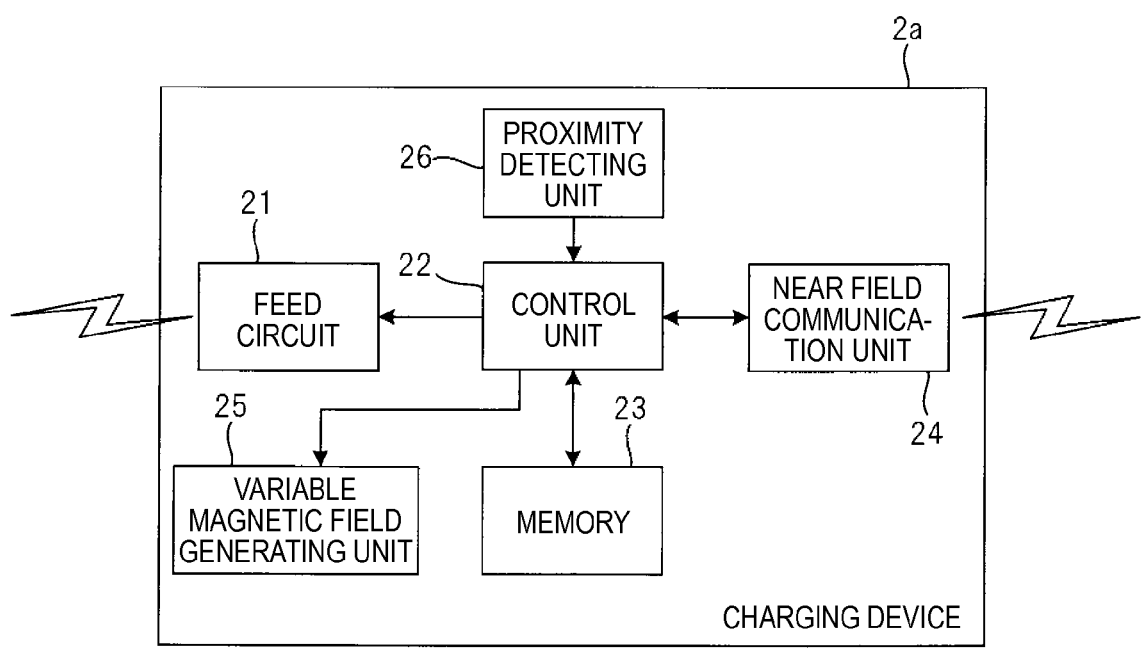
FIG. 7 is a block diagram illustrating an internal configuration of a charging device 2a which is a modified embodiment of a charging device 2 in a charging system 100.

FIG. 7 is a block diagram illustrating an internal configuration of a charging device 2a which is a modified embodiment of a charging device 2 in a charging system 100. A charging device 2a has the same configuration as the charging device 2 except for adding a proximity detecting unit 26.

The proximity detecting unit 26 detects a proximity indicating how much the electronic equipment 1 is close to the charging device 2a.

The proximity detecting unit 26 detects a proximity between the electronic equipment 1 and the charging device 2a by a physical sensor (a proximity sensor) provided in a flat unit on which the electronic equipment 1 of the charging device 2a is disposed.

Alternatively, the physical sensor is provided at the electronic equipment 1 side and the electronic equipment 1 detects the proximity between the electronic equipment 1 and an object by the physical sensor and a detected signal is transmitted from the near field communication unit 16 to the near field communication unit 24.

Further, the control unit 22 of the charging device 20 obtains the detected signal to detect the proximity between the charging device 2a and the electronic equipment 1. That is, the control unit 22 may serve as the proximity detecting unit 26.

Figure 8:
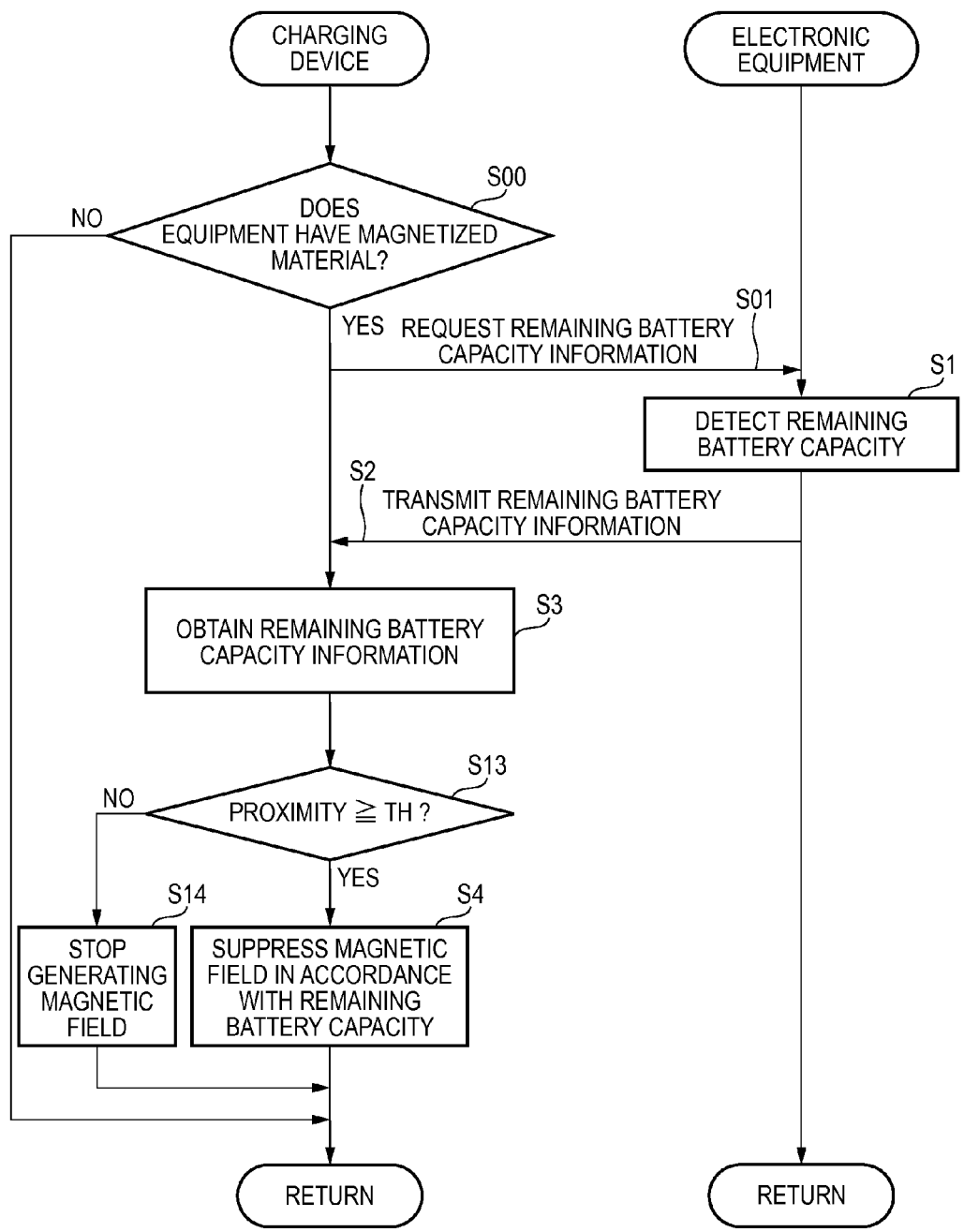

FIG. 8 is a flow chart explaining an operation of a charging system including the electronic equipment 1 and the charging device 2a. Processes of FIG. 8 which are the same as the processes in FIG. 4 are denoted by the same reference symbols. Further, it is assumed that the control unit 22 of the charging device 2a does not generate a magnetic field from the variable magnetic field generating unit 25 at the time of starting charging.

After step S3, the control unit 22 of the charging device 2a determines whether the proximity detected by the proximity detecting unit 26 is equal to or higher than a predetermined threshold value TH and performs a process of step S14 when the proximity is equal to or higher than the threshold value TH (YES in step S13), and performs a process of step S4 when the proximity is lower than the threshold value TH (NO in step S13).

Further, the threshold value TH of the proximity, for example, may be set to a value detected by a sensor when the charging device 2a is in contact with the electronic equipment 1 but is not limited thereto and may be a value detected by the sensor when the charging device 2a and the electronic equipment 1 are slightly spaced apart from each other.

In step S14, when the magnetic field is generated from the variable magnetic field generating unit 25, the control unit 22 of the charging device 2a performs a control to make the magnetic field generated from the variable magnetic field generating unit 25 zero (stop generating the magnetic field).

As described above, in a state where the proximity is equal to or higher than the threshold value TH since the electronic equipment 1 is disposed on the flat unit of the charging device 2a, the magnetic field is not generated from the variable magnetic field generating unit 25 and in a state where the electronic equipment 1 is lifted up so as not to be in contact with the charging device 2a and the proximity is lower than the threshold value TH, a magnetic field depending on the remaining battery capacity is generated from the variable magnetic field generating unit 25.

By doing this, as compared with a case when the magnetic field depending on the remaining battery capacity is constantly generated from the variable magnetic field generating unit 25, power consumption of the charging device 2a may be suppressed. Therefore, a charging efficiency may be improved.

Further, after a predetermined time has elapsed from a time when the proximity becomes lower than the threshold value TH (for example, the electronic equipment 1 is lifted up so as not to be in contact with the charging device 2a), the control unit 22 of the charging device 2a may cause the variable magnetic field generating unit 25 to generate the magnetic field depending on the remaining battery capacity.

By doing this, at a moment when the electronic equipment 1 is lifted up, since only a weight of the electronic equipment 1 is sensed and then a magnetic force in accordance with the remaining battery capacity is generated, the remaining battery capacity may be more easily transmitted.

Further, in step S14 of FIG. 8, the control unit 22 of the charging device 2a may cause the variable magnetic field generating unit 25 to generate a magnetic field (a magnetic field which generates an attractive force) having a fixed strength which does not depend on the remaining battery capacity, instead of making the magnetic field generated from the variable magnetic field generating unit 25 zero.

That is, in a state where the proximity is equal to or higher than the threshold value TH (for example, in a state where the electronic equipment 1 is disposed on the flat unit of the charging device 2a), a magnetic field having a fixed strength may be generated from the variable magnetic field generating unit 25 and in a state where the proximity is lower than the threshold value TH (in a state where the electronic equipment 1 is lifted up so as not to be in contact with the charging device 2a), a magnetic field depending on the remaining battery capacity may be generated from the variable magnetic field generating unit 25.

By doing this, while the electronic equipment 1 is in contact with the charging device 2a, the electronic equipment 1 may be fixed to the charging device 2a by an attractive force generated by a magnetic field having a fixed strength. Therefore, misalignment of the electronic equipment 1 which is being charged is prevented, thereby improving the charging efficiency.

Even though a magnetic field having a fixed strength may be a maximum value of a controllable magnetic field in order to prevent the misalignment, but the magnetic field is not limited thereto and may be a magnetic field having an arbitrary strength.

Technical contents of the second modified embodiment may be combined with the first modified embodiment.

That is, before steps S10 and S11 of FIG. 6, a proximity of the electronic equipment and the charging device is determined to perform processes of steps S10 and S11 when the electronic equipment is not in contact with the charging device, or perform control to stop generating the magnetic field when the electronic equipment and the charging device are in contact with each other.

Third Modified Embodiment

Figure 9:
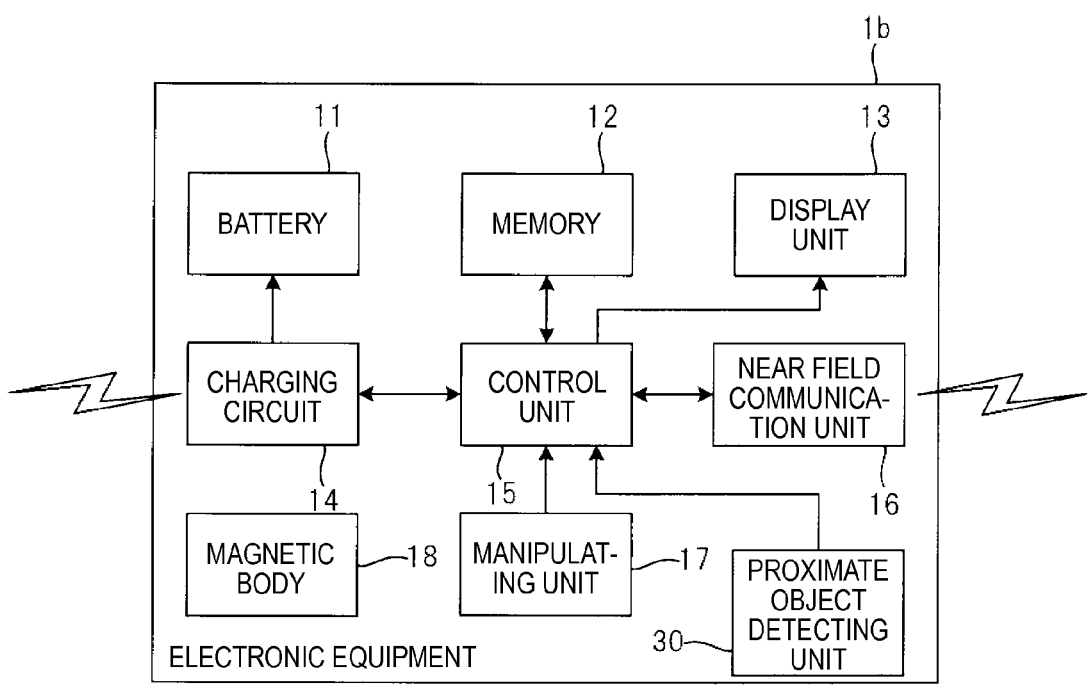
FIG. 9 is a block diagram illustrating an internal configuration of an electronic equipment 1b which is a modified embodiment of an electronic equipment 1 in a charging system 100.

FIG. 9 is a block diagram illustrating an internal configuration of an electronic equipment 1b which is a modified embodiment of the electronic equipment 1 in a charging system 100. The electronic equipment 1b has the same configuration as the electronic equipment 1 except for adding a proximate object detecting unit 30.

The proximate object detecting unit 30 is configured by a sensor which detects an object when the object is within a predetermined distance from the electronic equipment 1 and outputs a detected signal. The detected signal output from the proximate object detecting unit 30 is input to the control unit 15.

Figure 10:
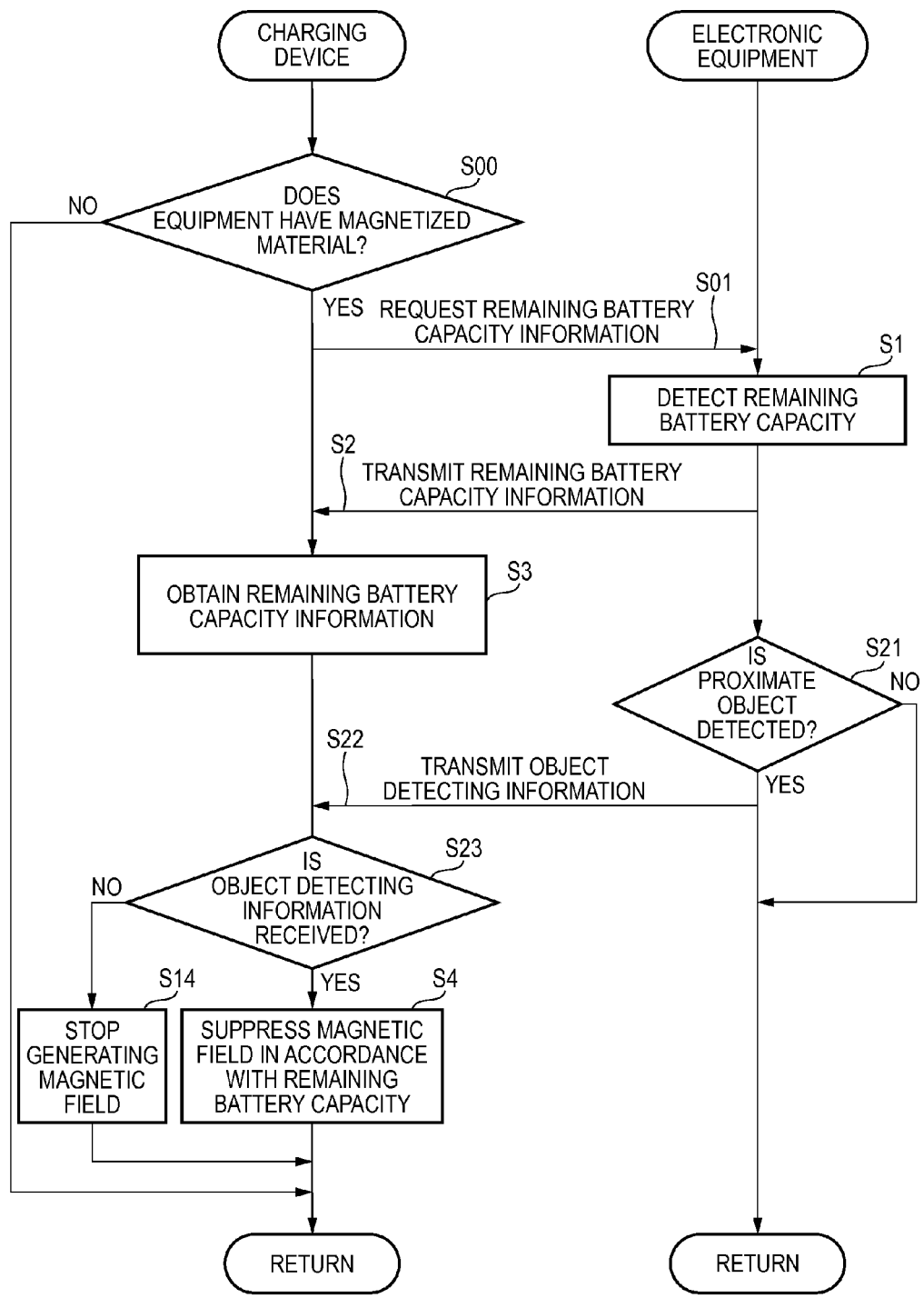
FIG. 10 is a flow chart explaining an operation of a charging system including an electronic equipment 1b and a charging device 2.

FIG. 10 is a flow chart explaining an operation of a charging system including the electronic equipment 1b and the charging device 2. Processes of FIG. 10 which are the same as the processes in FIG. 4 are denoted by the same reference symbols.

After the process of step S2, a control unit 15 of the electronic equipment 1b determines whether a detected signal is input from the proximate object detecting unit 30 (step S21), and performs the process of step S22 when the detected signal is input or performs the process of step S1 again after a predetermined time has elapsed when the detected signal is not input.

In step S22, the control unit 15 transmits the detected signal which is input from the proximate object detecting unit 30 to the charging device 2 through the near field communication unit 16.

After the process of step S3, the control unit 22 of the charging device 2 performs the process of step S4 when the detected signal is received by the near field communication unit 24 (YES in step S23) or performs the process of step S14 when the detected signal is not received (NO in step S23).

As described above, only when the object (for example, hands of a human) approaches the electronic equipment 1b, the strength of the magnetic field is controlled in accordance with the remaining battery capacity and when there is no object near the electronic equipment 1b, the generation of the magnetic field stops.

Therefore, as compared with a case when the magnetic field in accordance with the remaining battery capacity is constantly generated from the variable magnetic field generating unit 25, power consumption of the charging device 2 may be suppressed. Therefore, a charging efficiency may be improved.

Further, even in a state where the electronic equipment 1b is not lifted up from the charging device 2, when a human hand is in contact with the electronic equipment 1b, the magnetic force is generated by the magnetic field in accordance with the remaining battery capacity. Therefore, even when the electronic equipment 1b moves in a horizontal direction while being in contact with the charging device 2, a sense of a weight in accordance with the remaining battery capacity may be applied.

Further, also in step S14 of FIG. 10, instead of stopping generating the magnetic field, a magnetic field (a magnetic field which generates an attractive force) having a fixed strength is generated, thereby improving a charging efficiency by preventing the misalignment at the time of charging.

Further, technical contents of the third modified embodiment may be combined with the first modified embodiment.

Fourth Modified Embodiment

Figure 11:
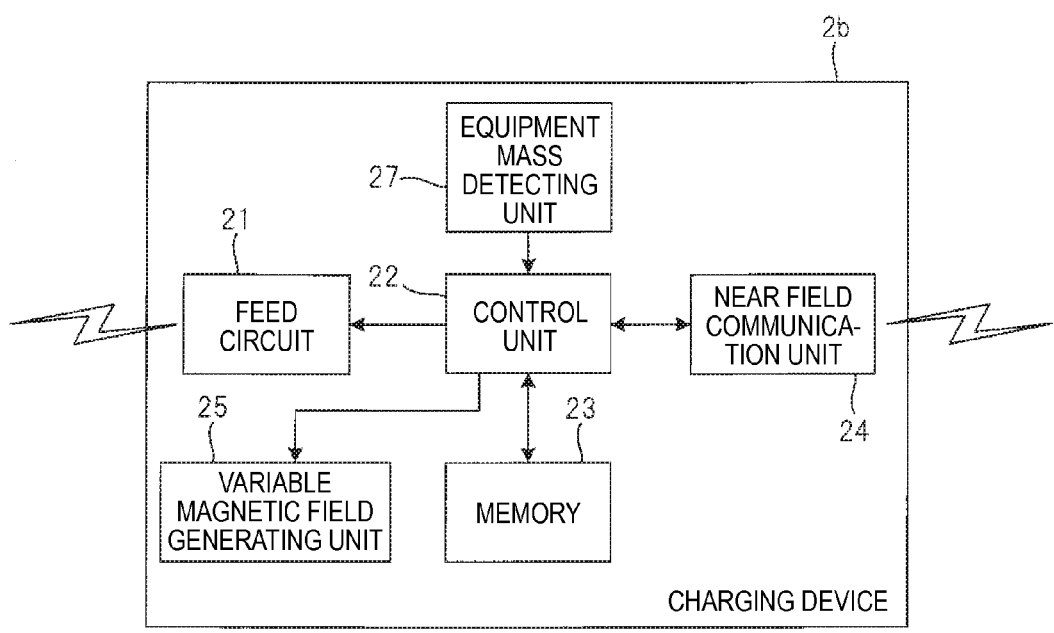
FIG. 11 is a block diagram illustrating an internal configuration of a charging device 2b which is a modified embodiment of a charging device 2 in a charging system 100.

FIG. 11 is a block diagram illustrating an internal configuration of a charging device 2b which is a modified embodiment of the charging device 2 in the charging system 100. A charging device 2b has the same configuration as the charging device 2 except for adding an equipment mass detecting unit 27.

The equipment mass detecting unit 27 is configured by a load sensor installed in the flat unit on which the electronic equipment 1 is disposed. The equipment mass detecting unit 27 detects a mass of the electronic equipment 1 disposed on the flat unit by the load sensor and inputs information on the detected mass to the control unit 22.

When the magnetic field depending on the remaining battery capacity is generated from the variable magnetic field generating unit 25, the control unit 22 of the charging device 2b determines the strength of a magnetic field generated from a variable magnetic field generating unit 25 by considering information on a mass of the electronic equipment 1 input from the equipment mass detecting unit 27.

When an attractive force is generated between the variable magnetic field generating unit 25 and a magnetic body 18, even though the remaining battery capacities are equal to each other, a gravity force of a heavier electronic equipment 1 is stronger, so that it is hard to lift up the electronic equipment 1.

Therefore, in this case, even at the same remaining battery capacity, the control unit 22 of the charging device 2b controls the strength of the magnetic field to be decreased as the mass of the electronic equipment 1 is increased, so that the load is lessened when the electronic equipment 1 is lifted up and the convenience is improved.

Further, when a repulsive force is generated between the variable magnetic field generating unit 25 and the magnetic body 18, even at the same remaining battery capacity, a gravity force of a lighter electronic equipment 1 is decreased and a rapid upward force is applied when the electronic equipment 1 is lifted up, so that the equipment is likely to be released.

Therefore, in this case, even at the same remaining battery capacity, the control unit 22 of the charging device 2b controls the strength of the magnetic field to be decreased as the mass of the electronic equipment 1 is decreased, so that the rapid upward force is prevented from being applied to the electronic equipment 1 and a safety of the equipment may be secured.

Further, if the equipment mass detecting unit 27 obtains information on the mass of the electronic equipment 1, the equipment mass detecting unit 27 may have a configuration other than the load sensor.

For example, information on the mass of the electronic equipment 1 is stored in the memory 12 of the electronic equipment 1 in advance and the control unit 22 of the charging device 2b may obtain the information on the mass stored in the memory 12 of the electronic equipment 1 through the near field communication unit 24.

Further, technical contents of the fourth modified embodiment may be combined with any one of the first to third modified embodiments.

Fifth Modified Embodiment

Figure 12:
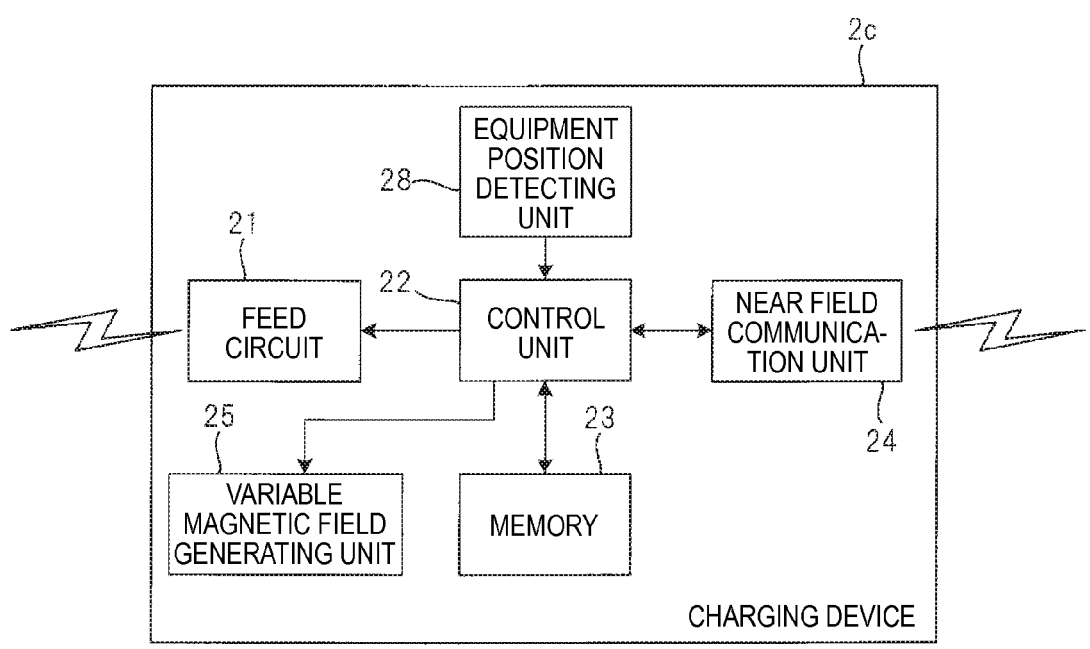
FIG. 12 is a block diagram illustrating an internal configuration of a charging device 2c which is a modified embodiment of a charging device 2 in a charging system 100.

FIG. 12 is a block diagram illustrating an internal configuration of a charging device 2c which is a modified embodiment of the charging device 2 in a charging system 100. A charging device 2c has the same configuration as the charging device 2 except for adding an equipment position detecting unit 28.

The charging device 2c includes a plurality of feed circuits 21 and the plurality of feed circuits 21 is two-dimensionally disposed on the flat unit on which the electronic equipment 1 is disposed.

The equipment position detecting unit 28 specifies a feed circuit 21 which is close to a power receiving coil included in the charging circuit 14 of the electronic equipment 1, among the plurality of feed circuits 21 to detect the position of the electronic equipment 1 on the flat unit of the charging device 2c.

Further, for example, the equipment position detecting unit 28 may be configured such that a position of the flat unit of the electronic equipment 1 disposed on the flat unit is detected by a plurality of pressure sensitive sensors which is two-dimensionally disposed on the flat unit of the charging device 2c.

When the magnetic field depending on the remaining battery capacity is generated from the variable magnetic field generating unit 25, the control unit 22 of the charging device 2c determines the strength of a magnetic field generated from a variable magnetic field generating unit 25 by considering information on a position of the electronic equipment 1 input from the equipment position detecting unit 28.

Further, in this modified embodiment, the magnetic field generated from the variable magnetic field generating unit 25 is a magnetic field (a magnetic field which generates an attractive force between the variable magnetic field generating unit 25 and the magnetic body 18) in a direction where opposing portions of the variable magnetic field generating unit 25 and the magnetic body 18 have opposite polarities.

Specifically, the control unit 22 changes the strength of the magnetic field, which is determined depending on the remaining battery capacity, in accordance with the position of the electronic equipment 1.

For example, when the electronic equipment 1 is located at the center of the flat unit of the charging device 2 or at a periphery of the flat unit, the magnetic field when the electronic equipment 1 is located at the periphery is strong. That is, even at the same remaining battery capacity, the strength of the magnetic field is increased as the electronic equipment 1 is located at the periphery of the flat unit rather than the center thereof.

In a situation when the electronic equipment 1 is disposed at the periphery of the flat unit, when the electronic equipment 1 moves due to impact, the electronic equipment 1 may be out of the flat unit of the charging device 2c, so that the charging may not be satisfactorily performed.

Therefore, as described above, when the electronic equipment 1 is disposed at a peripheral region of the flat unit, the attractive force becomes strong to prevent the misalignment of the electronic equipment 1, thereby preventing the charging efficiency from being lowered.

Further, technical contents of the fifth modified embodiment may be combined with any one of the first to fourth modified embodiments.

Sixth Modified Embodiment

Figure 13:
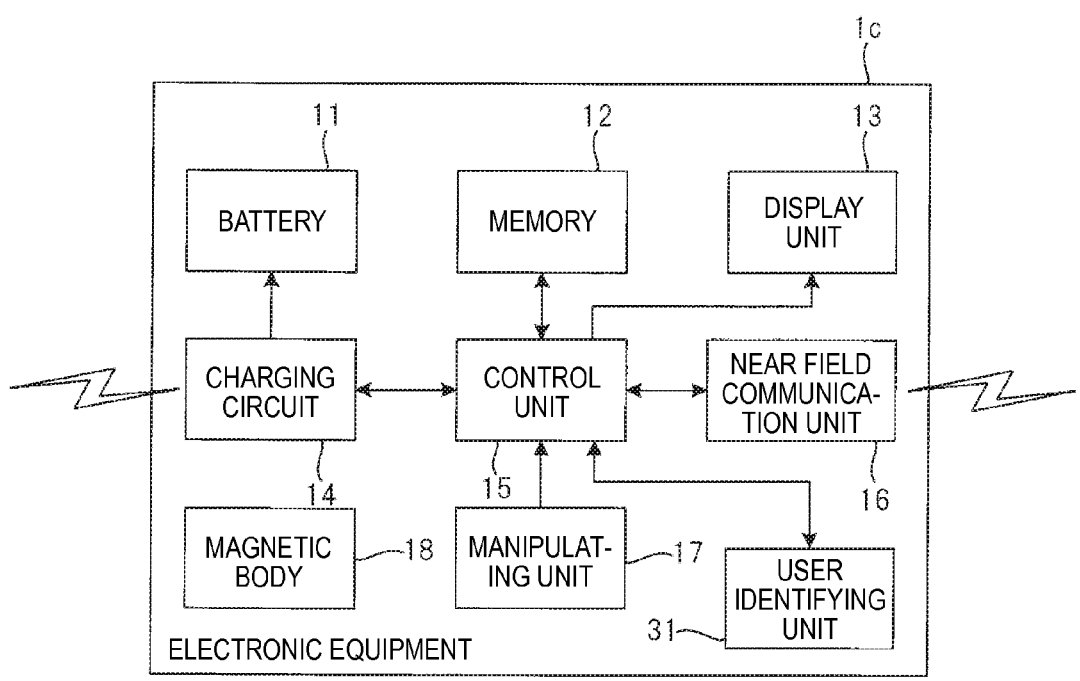
FIG. 13 is a block diagram illustrating an internal configuration of an electronic equipment 1c which is a modified embodiment of an electronic equipment 1 in a charging system 100.

FIG. 13 is a block diagram illustrating an internal configuration of an electronic equipment 1c which is a modified embodiment of the electronic equipment 1 in a charging system 100. The electronic equipment 1c has the same configuration as the electronic equipment 1 except for adding a user identifying unit 31.

The user identifying unit 31 identifies a person who is in contact with the electronic equipment 1c and determines whether the identified person is a person who has been registered in advance.

The user identifying unit 31 identifies the person who is in contact with the electronic equipment 1c by a technique such as finger print verification, iris verification, or face image verification.

In the memory 12 of the electronic equipment 1c, information (a finger print, an iris, or a face image) required to identify the person is registered in advance by user manipulation.

The user identifying unit 31 compares information of a person obtained by a finger print sensor, an iris sensor, or a camera with the information registered in the memory 12 to identify the person who is in contact with the electronic equipment 1c.

When the person identified by the user identifying unit 31 does not match the person who is registered in advance, the control unit 15 of the electronic equipment 1c generates an unfair usage signal to transmit the signal from the near field communication unit 16 to the charging device 2.

When the unfair usage signal is received from the electronic equipment 1c, the control unit 22 of the charging device 2 makes the magnetic field generated from the variable magnetic field generating unit 25 be a maximum value of a magnetic field in the same direction where the opposing portions of the variable magnetic field generating unit 25 and the magnetic body 18 have opposing polarities without depending on the remaining battery capacity and when the unfair usage signal is not received from the electronic equipment 1c, the control unit 22 controls the magnetic field generated from the variable magnetic field generating unit 25 in accordance with the remaining battery capacity.

Therefore, when a person other than an owner of the electronic equipment 1c takes the electronic equipment 1c away from the owner, the magnetic field generated from the variable magnetic field generating unit 25 is maximized, so that the electronic equipment 1c is strongly attracted to the charging device 2.

Therefore, it is possible to prevent the electronic equipment 1c from being taken away, protection against theft may be achieved. In the meantime, the owner of the electronic equipment 1c may register the usage of the electronic equipment 1c in advance and thus freely carry the electronic equipment 1c.

Further, in the memory 12 of the electronic equipment 1c, in addition to the information required to identify the person, setting information of the strength of a magnetic field corresponding to the registered person is registered and when the person identified by the user identifying unit 31 matches the person who is registered in advance, the control unit 15 of the electronic equipment 1c transmits setting information corresponding to the identified person to the charging device 2. Further, the control unit 22 of the charging device 2 may control to generate a magnetic field in accordance with the setting information received from the electronic equipment 1c and the remaining battery capacity or the free battery capacity.

The setting information is information indicating the strength of the magnetic field, for example, three levels of strong, normal, and weak and the magnetic field generated from the variable magnetic field generating unit 25 may be controlled at three levels of strong, normal, and weak in accordance with the setting information, even at the same remaining battery capacity.

As described above, the strengths of the magnetic field are set for every person who uses the electronic equipment 1c so that a sense of a weight of the electronic equipment in accordance with the remaining battery capacity may be optimized for every person, so that usability may be improved.

Further, technical contents of the sixth modified embodiment may be combined with any one of the first to fifth modified embodiments.

In the above description, even though the magnetic field generated between the charging device and the electronic equipment is controlled at the charging device side, the control may be performed at the electronic equipment side.

For example, the magnetic body 18 in FIG. 2 is changed into the variable magnetic field generating unit 25 of the charging device 2 illustrated in FIG. 3. The system is configured such that the variable magnetic field generating unit 25 in FIG. 3 is changed into the magnetic body 18 in FIG. 2, and the control unit 15 of the electronic equipment 1 may control the magnetic field generated from the variable magnetic field generating unit 25 in accordance with the remaining capacity or the free capacity in the battery 11.

Further, in the first modified embodiment, the system is configured such that the magnet 19 of the electronic equipment 1b is switched into the variable magnetic field generating unit 25 of the charging device 2 and the electronic equipment 1a controls the strength of the magnetic field generated from the variable magnetic field generating unit 25 in accordance with the remaining battery capacity and the charging device 2 controls the magnetic field generated from the magnet 19 in accordance with a value depending on the remaining battery capacity or to be a magnetic field having a predetermined fixed strength. Also in this configuration, the attractive force or the repulsive force may be generated between the magnet 19 and the variable magnetic field generating unit 25 in accordance with the remaining battery capacity.

Further, in the second modified embodiment, the system is configured such that the variable magnetic field generating unit 25 in FIG. 7 is switched into the magnetic body 18 and the magnetic body 18 in FIG. 2 is switched into the variable magnetic field generating unit 25 and the control unit 15 of the electronic equipment 1 obtains information from the equipment contact detecting unit 26 and controls the magnetic field generated from the variable magnetic field generating unit 25 in accordance with the information.

Further, in the third modified embodiment, the system is configured such that the magnetic body 18 in FIG. 9 is switched into the variable magnetic field generating unit 25 and the variable magnetic field generating unit 25 in FIG. 2 is switched into the magnetic body 18 and the control unit 15 of the electronic equipment 1b controls the magnetic field generated from the variable magnetic field generating unit 25 in accordance with the output signal of the proximate object detecting unit 30.

Further, in the fourth modified embodiment, the system is configured such that the variable magnetic field generating unit 25 in FIG. 11 is switched into the magnetic body 18 and the magnetic body 18 in FIG. 2 is switched into the variable magnetic field generating unit 25. The control unit 15 of the electronic equipment 1 obtains mass information of the electronic equipment 1 detected by the equipment mass detecting unit 27 from the charging device 2b and controls the magnetic field generated from the variable magnetic field generating unit 25 in accordance with the mass information.

Further, in the fifth modified embodiment, the system is configured such that the variable magnetic field generating unit 25 in FIG. 12 is switched into the magnetic body 18 and the magnetic body 18 in FIG. 2 is switched into the variable magnetic field generating unit 25. The control unit 15 of the electronic equipment 1 obtains position information of the electronic equipment 1 detected by the equipment position detecting unit 28 from the charging device 2c and controls the magnetic field generated from the variable magnetic field generating unit 25 in accordance with the information.

Further, in the sixth modified embodiment, the system is configured such that the magnetic body 18 in FIG. 13 is switched into the variable magnetic field generating unit 25 and the variable magnetic field generating unit 25 in FIG. 3 is switched into the magnetic body 18. The control unit 15 of the electronic equipment 1c may control the magnetic field generated from the variable magnetic field generating unit 25 in accordance with the identification result of the user identifying unit 31.

Further, until now, even though an example which controls a magnetic force acting between the electronic equipment and the charging device in accordance with the remaining battery capacity or the free battery capacity of the electronic equipment has been described, the control method described above may be applied in various ways.

For example, when a portable terminal having an electronic money function is considered as the electronic equipment 1, a magnetic force acting between the electronic equipment and the charging device is controlled in accordance with an amount of the electronic money registered in the portable terminal, so that the amount of the electronic money remaining in the portable terminal may be sensuously noticed.

As described above, the specification discloses the following matters.

It is disclosed a charging device having a power transmitting unit which wirelessly transmits power, including: a magnetic field generating unit that generates a magnetic field having a variable strength; a magnetic field control unit that controls the magnetic field generated by the magnetic field generating unit; and a determining unit that determines whether an electronic equipment capable of receiving the power transmitted by the power transmitting unit has a magnetized material having a magnetizing property, in which when the determining unit determines that the electronic equipment has the magnetized material, the magnetic field control unit controls the strength of the magnetic field generated by the magnetic field generating unit to vary at plural levels excluding zero in accordance with a remaining capacity or an available charging free capacity in a battery of the electronic equipment.

It is disclosed the charging device, in which when the determining unit determines that the electronic equipment does not have the magnetized material, the magnetic field control unit causes the magnetic field generating unit not to generate the magnetic field.

It is disclosed the charging device, further including: a proximity detecting unit which detects a proximity with the electronic equipment, in which when the determining unit determines that the electronic equipment has the magnetized material, the magnetic field control unit varies the strength of the magnetic field in accordance with the proximity and the remaining capacity or the available charging free capacity.

It is disclosed the charging device, in which the magnetic field control unit causes the magnetic field generating unit not to generate the magnetic field in a state where the proximity with the electronic equipment having the magnetized material is equal to or higher than a predetermined value and causes the magnetic field generating unit to generate the magnetic field having the strength in accordance with the remaining capacity or the available charging free capacity at a time when the proximity becomes lower than the predetermined value.

It is disclosed the charging device, further including: a proximity detecting unit that detects a proximity with the electronic equipment, in which when the determining unit determines that the electronic equipment has the magnetized material, the magnetic field control unit causes the magnetic field generating unit not to generate the magnetic field in a state where the proximity with the electronic equipment having the magnetized material is equal to or higher than a predetermined value and causes the magnetic field generating unit to generate the magnetic field having the strength in accordance with the remaining capacity or the available charging free capacity after a predetermined time elapses from a time when the proximity becomes lower than the predetermined value.

It is disclosed the charging device, further including: a proximity detecting unit that detects a proximity with the electronic equipment, in which when the determining unit determines that the electronic equipment has the magnetized material, the magnetic field control unit causes the magnetic field generating unit to generate the magnetic field having a fixed strength which generates an attractive force with the magnetized material in a state where the proximity with the electronic equipment having the magnetized material is equal to or higher than a predetermined value regardless of the remaining capacity or the available charging free capacity and causes the magnetic field generating unit to generate the magnetic field having the strength in accordance with the remaining capacity or the available charging free capacity in a state where the proximity is lower than the predetermined value.

It is disclosed the charging device, further including: an approaching object detecting unit that detects approach of an object to the electronic equipment, in which the magnetic field control unit causes the magnetic field generating unit not to generate the magnetic field in a state where there is no object within a predetermined distance from the electronic equipment, and causes the magnetic field generating unit to generate the magnetic field having the strength in accordance with the remaining capacity or the available charging free capacity in a state where there is an object within the predetermined distance from the electronic equipment.

It is disclosed the charging device, further including: an equipment mass information obtaining unit that obtains information on a mass of the electronic equipment, in which the magnetic field control unit varies the strength of the magnetic field generated from the magnetic field generating unit in accordance with the remaining capacity or the available charging free capacity, in accordance with the mass of the electronic equipment.

It is disclosed the charging device, further including: an equipment contacting position detecting unit that detects a position of the electronic equipment on the charging device with which the electronic equipment is in contact, in which the magnetic field control unit varies the strength of the magnetic field generated from the magnetic field generating unit in accordance with the remaining capacity or the available charging free capacity, in accordance with the contact position of the electronic equipment.

It is disclosed the charging device, further including: an identifying unit that identifies a person who is in contact with the electronic equipment, in which the magnetic field control unit varies the strength of the magnetic field generated from the magnetic field generating unit in accordance with the remaining capacity or the available charging free capacity, in accordance with the person identified by the identifying unit.

It is disclosed the charging device, further including: an identifying unit that identifies a person who is in contact with the electronic equipment, in which when the person identified by the identifying unit is not a person who is registered in advance, the magnetic field control unit causes the magnetic field generating unit to generate the magnetic field having a fixed strength which generates an attractive force with the magnetized material, regardless of the remaining capacity or the available charging free capacity.

It is disclosed the charging device, in which the magnetized material is a magnet, and the magnetic field control unit controls to switch the magnetic field generated from the magnetic field generating unit between a first magnetic field which generates a repulsive force with the magnet and a second magnetic field which generates an attractive force with the magnet.

It is disclosed an electronic equipment having a power receiving unit which receives a power wirelessly transmitted from a charging device including a magnetized material having a magnetizing property and a battery charged by the power received by the power receiving unit, the electronic equipment including: a magnetic field generating unit that generates a magnetic field having a variable strength; and a magnetic field control unit that controls the magnetic field generated by the magnetic field generating unit, in which the magnetic field control unit varies the strength of the magnetic field generated by the magnetic field generating unit at plural levels excluding zero, in accordance with a remaining capacity or an available charging free capacity in the battery.

It is disclosed the electronic equipment, further including: a proximity detecting unit that detects a proximity with the charging device, in which the magnetic field control unit varies the strength of the magnetic field in accordance with the proximity and the remaining capacity or the available charging free capacity.

It is disclosed the electronic equipment, in which the magnetic field control unit causes the magnetic field generating unit not to generate the magnetic field in a state where the proximity is equal to or higher than a predetermined value and causes the magnetic field generating unit to generate the magnetic field having the strength in accordance with the remaining capacity or the available charging free capacity at a time when the proximity becomes lower than the predetermined value.

It is disclosed the electronic equipment, further including: a proximity detecting unit that detects a proximity with the charging device, in which the magnetic field control unit causes the magnetic field generating unit not to generate the magnetic field in a state where the proximity is equal to or higher than a predetermined value and causes the magnetic generating field to generate the magnetic field having the strength in accordance with the remaining capacity or the available charging free capacity after a predetermined time elapses from a time when the proximity becomes lower than the predetermined value.

It is disclosed the electronic equipment, further including: a proximity detecting unit that detects a proximity with the charging device, in which the magnetic field control unit causes the magnetic field generating unit to generate the magnetic field having a fixed strength which generates an attractive force with the magnetized material in a state where the proximity is equal to or higher than a predetermined value, regardless of the remaining capacity or the available charging free capacity.

It is disclosed the electronic equipment, further including: an approaching object detecting unit that detects approach of an object, in which the magnetic field control unit causes the magnetic field generating unit to not to generate the magnetic field in a state where there is no object within a predetermined distance from the electronic equipment, and causes the magnetic field generating unit to generate the magnetic field having the strength in accordance with the remaining capacity or the available charging free capacity in a state where there is an object within the predetermined distance from the electronic equipment.

It is disclosed the electronic equipment, further including: an equipment mass information obtaining unit that obtains information on a mass of the electronic equipment, in which the magnetic field control unit varies the strength of the magnetic field generated from the magnetic field generating unit in accordance with the remaining capacity or the available charging free capacity, in accordance with the mass of the electronic equipment.

It is disclosed the electronic equipment, further including: an equipment contacting position detecting unit that detects a position of the electronic equipment on the charging device with which the electronic equipment is in contact, in which the magnetic field control unit varies the strength of the magnetic field generated from the magnetic field generating unit in accordance with the remaining capacity or the available charging free capacity, and in accordance with the contact position of the electronic equipment.

It is disclosed the electronic equipment, further including: an identifying unit that identifies a person who is in contact with the electronic equipment, in which the magnetic field control unit varies the strength of the magnetic field generated from the magnetic field generating unit in accordance with the remaining capacity or the available charging free capacity, in accordance with the person identified by the identifying unit.

It is disclosed the electronic equipment, further including: an identifying unit that identifies a person who is in contact with the electronic equipment, in which when the person identified by the identifying unit is not a person who is registered in advance, the magnetic field control unit causes the magnetic field generating unit to generate the magnetic field having a fixed strength which generates an attractive force with the magnetized material, regardless of the remaining capacity or the available charging free capacity.

It is disclosed the electronic equipment, in which the magnetized material is a magnet, and the magnetic field control unit controls to switch the magnetic field generated from the magnetic field generating unit between a first magnetic field which generates a repulsive force with the magnet and a second magnetic field which generates an attractive force with the magnet.

It is disclosed a charging situation notifying method which uses a charging device having a power transmitting unit which wirelessly transmits a power and a magnetic field generating unit which generates a magnetic field, the method including: a magnetic field control step of varying, by the charging device, a strength of the magnetic field generated by the magnetic field generating unit; and a determining step of determining whether an electronic equipment capable of receiving the power transmitted by the power transmitting unit has a magnetized material having a magnetizing property, in which in the magnetic field control step, the strength of the magnetic field generated by the magnetic field generating unit varies at plural levels excluding zero, in accordance with a remaining capacity or an available charging free capacity in a battery of the electronic equipment determined to have the magnetized material.

It is disclosed a charging situation notifying method which uses an electronic equipment having a power receiving unit which receives a power wirelessly transmitted from a charging device including a magnetized material having a magnetizing property, a battery charged by the power received by the power receiving unit, and a magnetic field generating unit which generates a magnetic field, the method including: a magnetic field control step of varying, by the electronic equipment, a strength of the magnetic field generated by the magnetic field generating unit, in which in the magnetic field control step, the electronic equipment varies the strength of the magnetic field at plural levels excluding zero, in accordance with a remaining capacity of the power or an available charging free capacity in the battery.

INDUSTRIAL APPLICABILITY

According to the present invention, a charging device and a wireless charging enabled electronic equipment in which a charging situation of the electronic equipment which is wirelessly being charged can be comprehended without incurring unnecessary cost may be provided.

Although the present invention has been described above by the specific embodiments, the present invention is not limited to the embodiments but various modifications may be allowed without departing from a technical spirit of the disclosed invention.

This application is based on Japanese Patent Application No. 2012-189505 filed on Aug. 30, 2012 and content thereof is incorporated herein by reference.

REFERENCE SIGNS LIST

100: Charging system
1: Electronic equipment
2: Charging device
11: Battery
21: Feed circuit
22: Control unit
25: Variable magnetic field generating unit

The invention claimed is:

1. A charging device having a power transmitting unit which wirelessly transmits power, comprising:
a magnetic field generating unit that generates a magnetic field having a variable strength;
a magnetic field control unit that controls the magnetic field generated by the magnetic field generating unit; and
a determining unit that determines whether an electronic equipment capable of receiving the power transmitted by the power transmitting unit has a magnetized material having a magnetizing property,
wherein when the determining unit determines that the electronic equipment has the magnetized material, the magnetic field control unit controls the strength of the magnetic field generated by the magnetic field generating unit to vary at plural levels excluding zero in accordance with a remaining capacity or an available charging free capacity in a battery of the electronic equipment.

2. The charging device of claim 1,
wherein when the determining unit determines that the electronic equipment does not have the magnetized material, the magnetic field control unit causes the magnetic field generating unit not to generate the magnetic field.

3. The charging device of claim 1, further comprising:
a proximity detecting unit which detects a proximity with the electronic equipment,
wherein when the determining unit determines that the electronic equipment has the magnetized material, the magnetic field control unit varies the strength of the magnetic field in accordance with the proximity and the remaining capacity or the available charging free capacity.

4. The charging device of claim 3,
wherein the magnetic field control unit causes the magnetic field generating unit not to generate the magnetic field in a state where the proximity with the electronic equipment having the magnetized material is equal to or higher than a predetermined value and causes the magnetic field generating unit to generate the magnetic field having the strength in accordance with the remaining capacity or the available charging free capacity at a time when the proximity becomes lower than the predetermined value.

5. The charging device of claim 1, further comprising:
a proximity detecting unit that detects a proximity with the electronic equipment,
wherein when the determining unit determines that the electronic equipment has the magnetized material, the magnetic field control unit causes the magnetic field generating unit not to generate the magnetic field in a state where the proximity with the electronic equipment having the magnetized material is equal to or higher than a predetermined value and causes the magnetic field generating unit to generate the magnetic field having the strength in accordance with the remaining capacity or the available charging free capacity after a predetermined time elapses from a time when the proximity becomes lower than the predetermined value.

6. The charging device of claim 1, further comprising:
a proximity detecting unit that detects a proximity with the electronic equipment,
wherein when the determining unit determines that the electronic equipment has the magnetized material, the magnetic field control unit causes the magnetic field generating unit to generate the magnetic field having a fixed strength which generates an attractive force with the magnetized material in a state where the proximity with the electronic equipment having the magnetized material is equal to or higher than a predetermined value regardless of the remaining capacity or the available charging free capacity and causes the magnetic field generating unit to generate the magnetic field having the strength in accordance with the remaining capacity or the available charging free capacity in a state where the proximity is lower than the predetermined value.

7. The charging device of claim 1, further comprising:
an approaching object detecting unit that detects approach of an object to the electronic equipment,
wherein the magnetic field control unit causes the magnetic field generating unit not to generate the magnetic field in a state where there is no object within a predetermined distance from the electronic equipment, and causes the magnetic field generating unit to generate the magnetic field having the strength in accordance with the remaining capacity or the available charging free capacity in a state where there is an object within the predetermined distance from the electronic equipment.

8. The charging device of claim 1, further comprising:
an equipment mass information obtaining unit that obtains information on a mass of the electronic equipment,
wherein the magnetic field control unit varies the strength of the magnetic field generated from the magnetic field generating unit in accordance with the remaining capacity or the available charging free capacity, in accordance with the mass of the electronic equipment.

9. The charging device of claim 1, further comprising:
an equipment contacting position detecting unit that detects a position of the electronic equipment on the charging device with which the electronic equipment is in contact,
wherein the magnetic field control unit varies the strength of the magnetic field generated from the magnetic field generating unit in accordance with the remaining capacity or the available charging free capacity, in accordance with the contact position of the electronic equipment.

10. The charging device of claim 1, further comprising:
an identifying unit that identifies a person who is in contact with the electronic equipment,
wherein the magnetic field control unit varies the strength of the magnetic field generated from the magnetic field generating unit in accordance with the remaining capacity or the available charging free capacity, in accordance with the person identified by the identifying unit.

11. The charging device of claim 1, further comprising:
an identifying unit that identifies a person who is in contact with the electronic equipment,
wherein when the person identified by the identifying unit is not a person who is registered in advance, the magnetic field control unit causes the magnetic field generating unit to generate the magnetic field having a fixed strength which generates an attractive force with the magnetized material, regardless of the remaining capacity or the available charging free capacity.

12. The charging device of claim 1,
wherein the magnetized material is a magnet, and
the magnetic field control unit controls to switch the magnetic field generated from the magnetic field generating unit between a first magnetic field which generates a repulsive force with the magnet and a second magnetic field which generates an attractive force with the magnet.

13. An electronic equipment having a power receiving unit which receives a power wirelessly transmitted from a charging device including a magnetized material having a magnetizing property and a battery charged by the power received by the power receiving unit, the electronic equipment comprising:
a magnetic field generating unit that generates a magnetic field having a variable strength; and
a magnetic field control unit that controls the magnetic field generated by the magnetic field generating unit,
wherein the magnetic field control unit varies the strength of the magnetic field generated by the magnetic field generating unit at plural levels excluding zero, in accordance with a remaining capacity or an available charging free capacity in the battery.

14. The electronic equipment of claim 13, further comprising:
a proximity detecting unit that detects a proximity with the charging device,
wherein the magnetic field control unit varies the strength of the magnetic field in accordance with the proximity and the remaining capacity or the available charging free capacity.

15. The electronic equipment of claim 14, wherein the magnetic field control unit causes the magnetic field generating unit not to generate the magnetic field in a state where the proximity is equal to or higher than a predetermined value and causes the magnetic field generating unit to generate the magnetic field having the strength in accordance with the remaining capacity or the available charging free capacity at a time when the proximity becomes lower than the predetermined value.

16. The electronic equipment of claim 13, further comprising:
a proximity detecting unit that detects a proximity with the charging device,
wherein the magnetic field control unit causes the magnetic field generating unit not to generate the magnetic field in a state where the proximity is equal to or higher than a predetermined value and causes the magnetic generating field to generate the magnetic field having the strength in accordance with the remaining capacity or the available charging free capacity after a predetermined time elapses from a time when the proximity becomes lower than the predetermined value.

17. The electronic equipment of claim 13, further comprising:
a proximity detecting unit that detects a proximity with the charging device,
wherein the magnetic field control unit causes the magnetic field generating unit to generate the magnetic field having a fixed strength which generates an attractive force with the magnetized material in a state where the proximity is equal to or higher than a predetermined value, regardless of the remaining capacity or the available charging free capacity.

18. The electronic equipment of claim 13, further comprising:
an approaching object detecting unit that detects approach of an object,
wherein the magnetic field control unit causes the magnetic field generating unit to not to generate the magnetic field in a state where there is no object within a predetermined distance from the electronic equipment, and causes the magnetic field generating unit to generate the magnetic field having the strength in accordance with the remaining capacity or the available charging free capacity in a state where there is an object within the predetermined distance from the electronic equipment.

19. The electronic equipment of claim 13, further comprising:
an equipment mass information obtaining unit that obtains information on a mass of the electronic equipment,
wherein the magnetic field control unit varies the strength of the magnetic field generated from the magnetic field generating unit in accordance with the remaining capacity or the available charging free capacity, in accordance with the mass of the electronic equipment.

20. The electronic equipment of claim 13, further comprising:
an equipment contacting position detecting unit that detects a position of the electronic equipment on the charging device with which the electronic equipment is in contact,
wherein the magnetic field control unit varies the strength of the magnetic field generated from the magnetic field generating unit in accordance with the remaining capacity or the available charging free capacity, and in accordance with the contact position of the electronic equipment.

21. The electronic equipment of claim 13, further comprising:
an identifying unit that identifies a person who is in contact with the electronic equipment,
wherein the magnetic field control unit varies the strength of the magnetic field generated from the magnetic field generating unit in accordance with the remaining capacity or the available charging free capacity, in accordance with the person identified by the identifying unit.

22. The electronic equipment of claim 13, further comprising:
an identifying unit that identifies a person who is in contact with the electronic equipment,
wherein when the person identified by the identifying unit is not a person who is registered in advance, the magnetic field control unit causes the magnetic field generating unit to generate the magnetic field having a fixed strength which generates an attractive force with the magnetized material, regardless of the remaining capacity or the available charging free capacity.

23. The electronic equipment of claim 13,
wherein the magnetized material is a magnet, and
the magnetic field control unit controls to switch the magnetic field generated from the magnetic field generating unit between a first magnetic field which generates a repulsive force with the magnet and a second magnetic field which generates an attractive force with the magnet.

24. A charging situation notifying method which uses a charging device having a power transmitting unit which wirelessly transmits a power and a magnetic field generating unit which generates a magnetic field, the method comprising:
   a magnetic field control step of varying, by the charging device, a strength of the magnetic field generated by the magnetic field generating unit; and
   a determining step of determining whether an electronic equipment capable of receiving the power transmitted by the power transmitting unit has a magnetized material having a magnetizing property,
   wherein in the magnetic field control step, the strength of the magnetic field generated by the magnetic field generating unit varies at plural levels excluding zero, in accordance with a remaining capacity or an available charging free capacity in a battery of the electronic equipment determined to have the magnetized material.

25. A charging situation notifying method which uses an electronic equipment having a power receiving unit which receives a power wirelessly transmitted from a charging device including a magnetized material having a magnetizing property, a battery charged by the power received by the power receiving unit, and a magnetic field generating unit which generates a magnetic field, the method comprising:
   a magnetic field control step of varying, by the electronic equipment, a strength of the magnetic field generated by the magnetic field generating unit,
   wherein in the magnetic field control step, the electronic equipment varies the strength of the magnetic field at plural levels excluding zero, in accordance with a remaining capacity of the power or an available charging free capacity in the battery.

* * * * *